US006871247B1

(12) United States Patent
Nguyen et al.

(10) Patent No.: US 6,871,247 B1
(45) Date of Patent: Mar. 22, 2005

(54) MECHANISM FOR SUPPORTING SELF-MODIFYING CODE IN A HARVARD ARCHITECTURE DIGITAL SIGNAL PROCESSOR AND METHOD OF OPERATION THEREOF

(75) Inventors: Hung T. Nguyen, Plano, TX (US); Troy N. Hicks, Allen, TX (US)

(73) Assignee: LSI Logic Corporation, Milpitas, CA (US)

( * ) Notice: Subject to any disclaimer, the term of this patent is extended or adjusted under 35 U.S.C. 154(b) by 504 days.

(21) Appl. No.: 10/007,555

(22) Filed: Nov. 8, 2001

(51) Int. Cl.[7] .............................................. G06F 9/00
(52) U.S. Cl. ....................... 710/100; 712/33; 712/207
(58) Field of Search ............................... 710/100, 113, 710/305, 309, 240; 712/33, 35, 207

(56) References Cited

U.S. PATENT DOCUMENTS

| | | | |
|---|---|---|---|
| 5,996,071 A | * 11/1999 | White et al. ................ 712/238 |
| 6,209,083 B1 | * 3/2001 | Naini et al. ................. 712/229 |
| 6,516,378 B1 | * 2/2003 | Yamashita et al. .......... 710/306 |
| 2002/0053005 A1 | * 5/2002 | Hori ........................... 711/125 |
| 2002/0056030 A1 | * 5/2002 | Kelly et al. ................. 711/150 |
| 2002/0059393 A1 | * 5/2002 | Reimer et al. .............. 709/212 |

* cited by examiner

Primary Examiner—Glenn A. Auve
(74) Attorney, Agent, or Firm—Hitt Gaines PC

(57) ABSTRACT

For use in a processor having separate instruction and data buses, separate instruction and data memories and separate instruction and data units, a mechanism for, and method of, supporting self-modifying code and a digital signal processor incorporating the mechanism or the method. In one embodiment, the mechanism includes: (1) a crosstie bus coupling the instruction bus and the data unit and (2) a request arbiter, coupled between the instruction and data units, that arbitrates requests therefrom for access to the instruction memory.

20 Claims, 3 Drawing Sheets

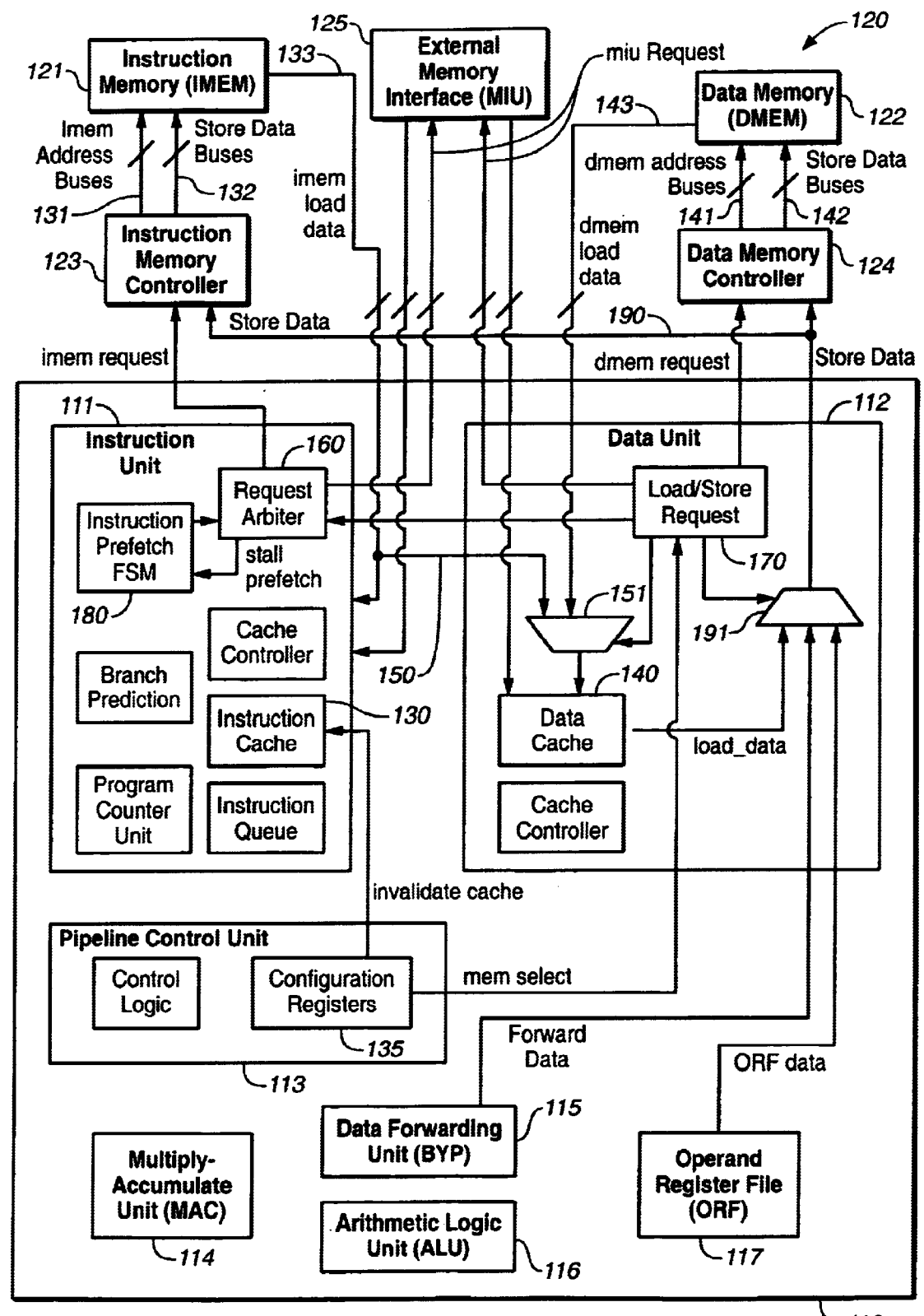
FIG._1

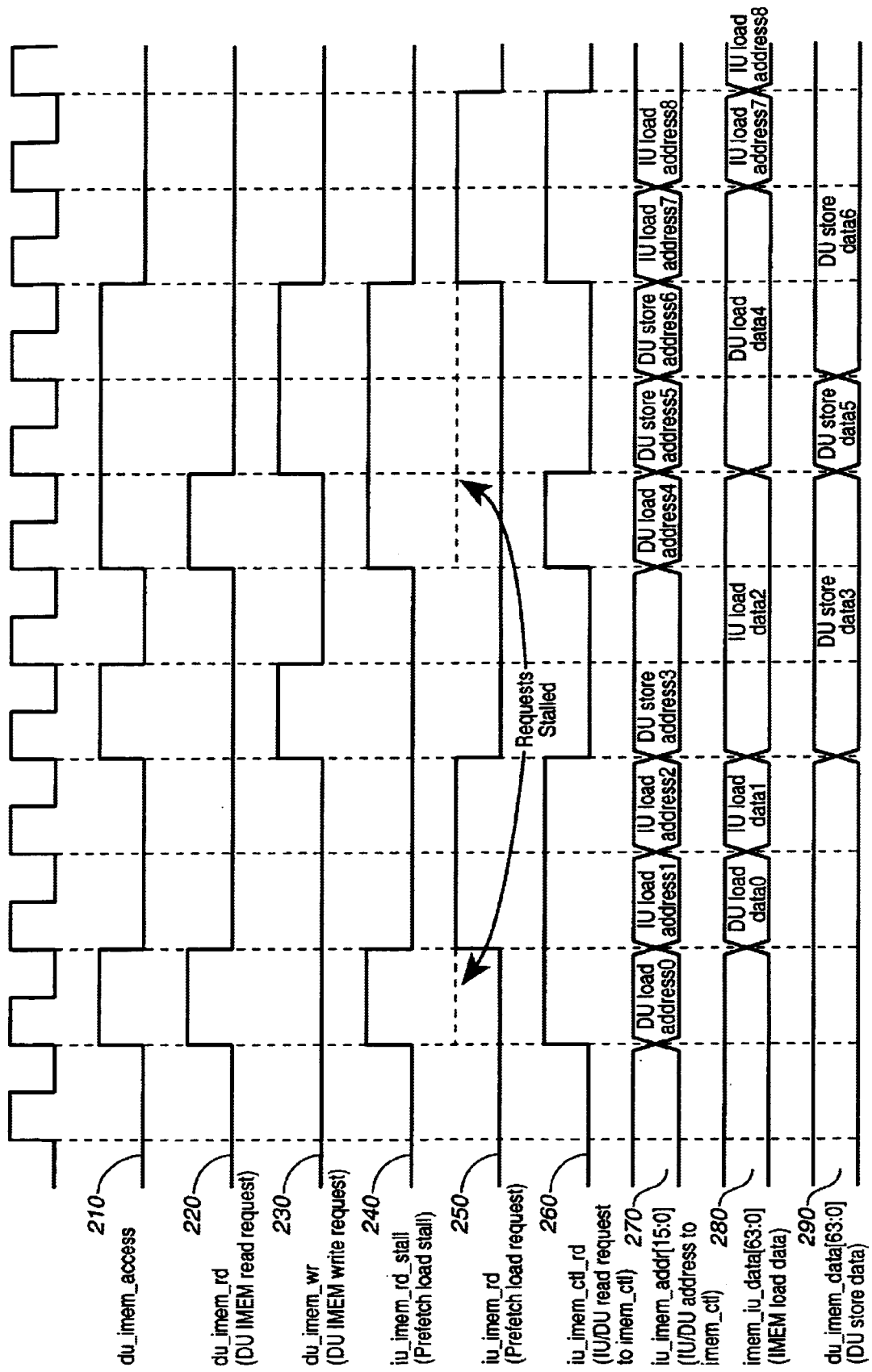
FIG._2

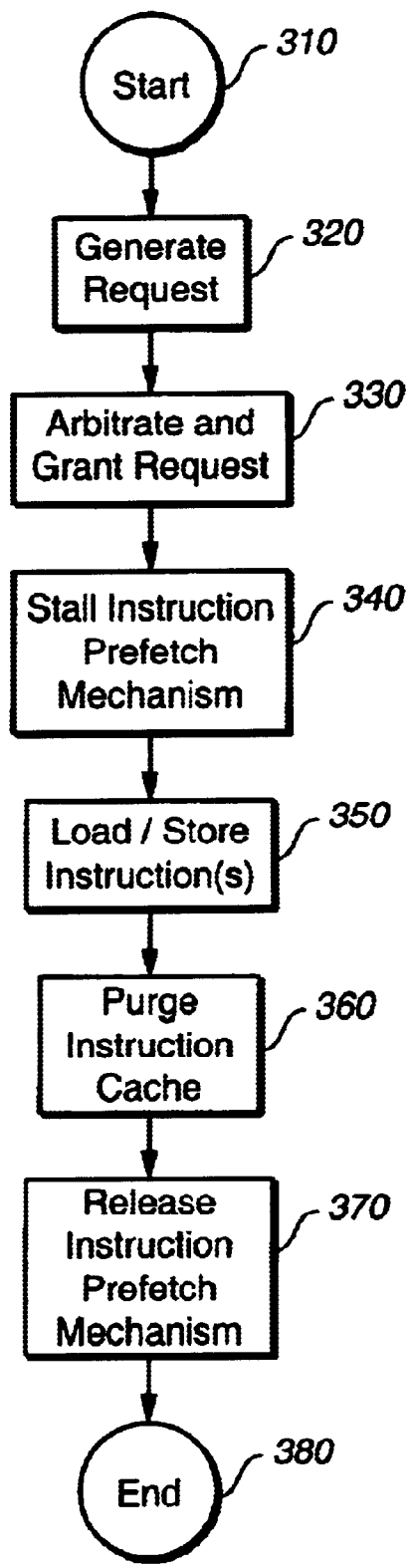
FIG._3

MECHANISM FOR SUPPORTING SELF-MODIFYING CODE IN A HARVARD ARCHITECTURE DIGITAL SIGNAL PROCESSOR AND METHOD OF OPERATION THEREOF

TECHNICAL FIELD OF THE INVENTION

The present invention is directed, in general, to digital signal processors (DSPs) and, more specifically, to a mechanism for supporting self-modifying code in a Harvard architecture DSP and a method of operating the same.

BACKGROUND OF THE INVENTION

Over the last several years, DSPs have become an important tool, particularly in the real-time modification of signal streams. They have found use in all manner of electronic devices and will continue to grow in power and popularity.

Those skilled in the art are familiar with DSP architecture in general. Conventional DSPs employ a pipeline through which pass data representing a signal to be processed. An execution core performs various mathematical and logical operations on the data to effect changes therein. Memory is coupled to the execution core. The memory contains not only instructions concerning the way in which the data are to be modified, but also further data that may be employed in conjunction with executing the instructions.

It becomes important at this point to discuss two details with respect to the way in which DSP memory may be architected. First, two fundamental DSP architectures exist that are distinguished from one another by how they interact with memory. So-called "von Neumann" architecture DSPs unify instructions and data in a single memory and a single bus. So-called "Harvard" architecture DSPs split instructions and data between two separate memories and buses and employ separate instruction and data units to load and store to the separate memories via the separate buses. The tradeoff is simplicity (von Neumann) versus speed (Harvard).

Second, more sophisticated DSPs stratify memory in an effort to balance speed, cost and power consumption. In a perfect and simple world, a DSP's memory would be extremely fast, low power, arbitrarily large and on the same physical substrate. Unfortunately, very fast memory is very expensive and requires lots of power and arbitrarily large memory takes an arbitrarily large amount of room on a given substrate. Tempering those requirements with today's commercial concerns regarding both chip and system cost, flexibility and power consumption, modern DSP architecture calls for memory to be stratified, perhaps into three or more layers.

Assuming for the moment that three layers are desired, those might be (1) an extremely small, fast cache, located on the same physical substrate as the processing core of the DSP, that contains very little, but highly relevant instructions or data, (2) a somewhat larger, somewhat slower memory, still located on the same physical substrate as the processing core of the DSP, that contains relevant instructions or data and (3) an external memory that is as large as need be to contain the entirety of a program and data that the DSP is to use, but that is located on a separate physical substrate and accessible only through a comparatively slow external memory interface. It should be noted that processors of all types, including ubiquitous microprocessors, employ the same stratification strategy to balance their speed and cost goals.

Certain tasks that processors may be called upon to perform benefit greatly from the use of "self-modifying code." A program containing self-modify-ng code changes that code during the program's execution. Self-modifying code turns out to be a powerful programming tool, because the very structure of a particular program can be made to adapt itself dynamically to conditions encountered during the program's execution. John von Neumann, a pioneer in computer science, recognized that computer programs and the data upon which those programs act are indistinguishable from one another, and hence can be stored in the same memory space. This is why the DSP architecture described above that unifies instructions and data in a single memory and a single bus is of a "von Neumann" architecture. In von Neumann architecture DSPs, self-modifying code is straightforward, because the instructions coexist with data, and are therefore readily accessible as though they were data.

However, in a Harvard architecture DSP, instructions are kept in a separate memory from data, and the data unit in the DSP does not have access to the instruction memory. What is needed in the art is an efficient way to accommodate the need for self-modifying code in a Harvard architecture DSP.

SUMMARY OF THE INVENTION

To address the above-discussed deficiencies of the prior art, the present invention provides, for use in a processor having separate instruction and data buses, separate instruction and data memories and separate instruction and data units, a mechanism for, and method of, supporting self-modifying code and a digital signal processor incorporating the mechanism or the method. In one embodiment, the mechanism includes: (1) a crosstie bus coupling the instruction bus and the data unit and (2) a request arbiter, coupled between the instruction and data units, that arbitrates requests therefrom for access to the instruction memory.

The present invention therefore introduces a mechanism by which a data unit can gain temporary access to the instruction memory for the purpose of loading, modifying and storing back code. The request arbiter ensures that either the instruction unit or the data unit, but not both, has access to the instruction memory at a given point in time. Until the request arbiter grants a request from the data unit for access to the instruction memory, the processor operates as a standard Harvard architecture processor.

In one embodiment of the present invention, the data unit can employ the instruction memory to contain data. Thus, the instruction memory can supplement the data memory. In a related embodiment, the request arbiter gives a higher priority to requests from the data unit. This embodiment assumes that requests by the data unit to modify code are more important than requests by the instruction unit to execute it. If the processor is prefetching instructions (as is the case in an embodiment to be illustrated and described), any delay in fetching instructions should have minimal impact on processor performance; the processor can execute prefetched and cached instructions while the data unit is modifying future instructions.

In one embodiment of the present invention, the mechanism further includes an instruction prefetch mechanism that prefetches instructions from the instruction memory into an instruction cache. The request arbiter stalls the prefetch mechanism when the request arbiter grants a request from the data unit for the access to the instruction memory. Prefetching can be employed to avoid latencies normally associated with loads from slower memory. The present invention can advantageously be used with prefetching, although this need not be the case. If prefetching is used, however, at least some of the instructions that are prefetched into the instruction cache should be invalidated when the request arbiter grants the request to ensure that old, unmodified code is not executed.

In one embodiment of the present invention, a programmable control register is employed to invalidate the at least some instructions. Those skilled in the pertinent art will recognize, however, that other techniques may be used to invalidate the instructions. In some applications, it may be advantageous to flush the entirety of the instruction cache indiscriminately.

In one embodiment of the present invention, the instruction memory is a local instruction memory and the processor further comprises an external memory interface. The external memory interface is advantageous for accommodating large, off-chip memories for containing arbitrarily large programs to be executed.

In one embodiment of the present invention, the processor is a digital signal processor. The teachings and principles of the present invention may, however, be applied to processors in general, including microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 1 illustrates an exemplary DSP which may form an environment within which a mechanism for supporting self-modifying code constructed according to the principles of the present invention can operate;

FIG. 2 illustrates a timing diagram of a mechanism for supporting self-modifying code constructed according to the principles of the present invention; and FIG. 3 illustrates a flow diagram of a method of supporting self-modifying code carried out according to the principles of the present invention.

DETAILED DESCRIPTION

Referring initially to FIG. 1, illustrated is an exemplary DSP, generally designated 100, which may form an environment within which a mechanism for supporting self-modifying code constructed according to the principles of the present invention can operate. Although the DSP 100 will now be described, those skilled in the pertinent art should understand that, apart from the novel mechanism for supporting self-modifying code, the DSP 100 is essentially conventional. Those skilled in the pertinent art should also understand that the mechanism for supporting self-modifying code can operate within the confines of other conventional or later-discovered DSP or general-purpose, non-DSP, processor architectures.

The DSP 100 contains an execution core 110 and a memory unit 120 that are located on the same physical substrate. The execution core 110 contains an instruction unit 111. The instruction unit 111 is responsible for ensuring that instructions are properly decoded, fetched, tracked and queued for execution. Besides containing control circuitry for performing these functions, the instruction unit 111 contains an instruction cache 130 to allow instructions to be fetched as a batch and executed sequentially, thereby avoiding latencies that would be encountered were each instruction to be retrieved from memory individually.

The execution core 110 also contains a data unit 112. The data unit 112 is responsible for managing data transfer (loads and stores) between memory and register storage. The data unit 112 also contains a data cache 140 that allows data to be loaded or stored as a batch.

In a normal operating environment, the DSP 100 operates on a stream of data. Accordingly, the execution core 110 of the DSP 100 is adapted to receive the data stream into a pipeline (not shown, but comprising several stages). The pipeline is under control of a pipeline control unit 113. The pipeline control unit 113 is responsible for moving the data stream through the pipeline and for ensuring that the data stream is operated on properly. Accordingly, the pipeline control unit 113 coordinates the instruction unit 111 and the data unit 112 to ensure that instructions and their corresponding data are synchronized with the data stream in the pipeline.

Several ancillary units assist in the execution of instructions. A multiply-accumulate unit 114 performs multiplication and division calculations and calculations that are substantially based on multiplication or division. A data forwarding unit 115 ensures that results of earlier data processing in the execution core 111 are available for subsequent processing without undue latency. An arithmetic logic 116 unit performs all other general mathematical and logical operations (such as addition, subtraction, shifting, rotating and Boolean operations) that the multiply-accumulate unit 114 is not called upon to do. Finally, an operand register file 117 provides extremely fast, flexible registers that store operands being processed.

The memory unit 120 contains the so-called "local memory" that, while slower than the instruction cache 130 of the instruction unit 111, the data cache of the data unit 112 or the registers contained within the operand register file 117, is nonetheless substantially faster than external memory (not shown, but conventional and not located on the same physical substrate as the DSP 100). The memory unit 120 contains both instruction memory 121 and data memory 122.

The instruction memory 121 is managed by an instruction memory controller 123. An instruction address bus 131 and an instruction store bus 132 couple the instruction memory controller 123 to the instruction memory 121 and respectively allow the instruction memory controller 123 to point to addresses within the instruction memory 121 and write instructions to those addresses in the instruction memory 121. An instruction load bus 133 couples the instruction memory 121 to the instruction unit 111, allowing instructions to be loaded (fetched) from the instruction memory 121 into the instruction cache 130.

Similarly, the data memory 122 is managed by a data memory controller 124. A data address bus 141 and a data store bus 142 couple the data memory controller 124 to the data memory 122 and respectively allow the data memory controller 124 to point to addresses within the data memory 122 and write data to those addresses in the instruction memory 122. A data load bus 143 couples the data memory 122 to the data unit 112, allowing data to be loaded (fetched) from the data memory 122 into the data cache 140.

The memory architecture of the DSP 100 is typical of conventional DSPs and microprocessors. That is, its registers are fast but small; its instruction and data caches are larger, but still inadequate to hold more than a handful of instructions or data; its instruction memory 121 and data memory 122 are larger still (64 kilobytes, in the case of the instruction memory 121), but may be inadequate to hold an entire program. Therefore, an external memory interface 125 can be coupled to external memory to augment local memory capability of the DSP 100. The external memory may be ultimately required to hold the entirety of a program which may be desired to execute in the DSP 100.

In the normal course of operation, requests from an instruction prefetch mechanism 180 are conveyed to the instruction memory controller 123 for fulfillment. This allows instructions to be prefetched for storage in the instruction cache 130 and eventual execution. However, the present invention calls for this structure to be modified to accommodate a mechanism for supporting self-modifying code.

The process of modifying code originates in a load/store request unit 170 in the data unit 112. The load/store request unit 170 is responsible for, among other things, generating requests for loading instructions from the instruction memory 121 that require modification and storing instructions back in the instruction memory 121 that have been modified. This effects self-modifying code.

FIG. 1 illustrates a request arbiter 160 interposing the instruction prefetch mechanism 180 and the instruction memory controller 123. One input of the request arbiter 160 is connected to the instruction prefetch mechanism 180 to allow normal prefetch requests to be accommodated. Another input of the request arbiter is connected to the load/store request unit 170. Requests generated by the load/store request unit 170 that call for instructions to be loaded (designated, in the illustrated embodiment, by means of a programmable control register within the data unit 112) travel from the load/store request unit 170 to this input of the request arbiter 160.

In the illustrated embodiment, the request arbiter 160 gives a higher priority to requests from the load/store request unit 170 than to requests from the instruction prefetch mechanism 180. There are two reasons for this. First, it is deemed more important to ensure that properly modified instructions are executed than to ensure that instructions are executed quickly. Second, since the load/store request unit 170 is not prefetching, and the instruction prefetch mechanism 180 is prefetching, a greater urgency exists with respect to requests from the load/store request unit 170. Fortunately, giving priority to requests from the load/store request unit 170 comes at minimal cost, since the pipeline control unit 130 can continue to execute previously prefetched instructions stored in the instruction cache 130 while the load/store request unit's request(s) are being fulfilled.

In the illustrated embodiment, the request arbiter 160 stalls the instruction prefetch mechanism 180 when the request arbiter 160 grants a request from the load/store request unit 170 of the data unit 112. This prevents further requests from the instruction prefetch mechanism 180 from having to be arbitrated.

FIG. 1 illustrates a load crosstie bus 150 that is coupled between the instruction load bus 133 and a data steering multiplexer 151. The load crosstie bus 150 is the path along which instructions fetched from the instruction memory 121 travel toward the data cache 140. The load/store request unit 170 drives the data steering multiplexer 151 to cause it to select the load crosstie bus 151 when instructions to be loaded are on the load crosstie bus 151.

Likewise, FIG. 1 illustrates a store crosstie bus 190. The load crosstie bus 150 and the store crosstie bus 190 together form a crosstie bus. The load crosstie bus 190 is the path along which instructions to be stored in the instruction memory 121 travel from the data unit 112. The load/store request unit 170 drives a data steering multiplexer 191 to cause it to place the correct instructions on the store crosstie bus 190.

Once instructions have been loaded, modified and stored back in the instruction memory 121, it becomes necessary to purge the instruction cache 130 of instructions that have been modified since they were prefetched. This can be done in several ways. However, in the illustrated embodiment, this is done by setting a flag (not shown) in a register within a block of configuration registers 135. Having been set, the flag indicates to existing circuitry within the instruction unit 111 that one or more lines (or all lines in the case of the illustrated embodiment) of the instruction cache 130 should be invalidated and purged (overwritten by means of subsequent prefetching).

Turning now to FIG. 2, illustrated is a timing diagram of a mechanism for supporting self-modifying code constructed according to the principles of the present invention. A du_imem_access signal 210 is asserted whenever the load/store request unit 170 either needs to load from, or store to, the instruction memory 121. The du_imem_access signal 210 is provided to the request arbiter 160 to cause the request arbiter 160 to grant the load/store request unit 170 access to the instruction memory controller 123 and to stall the instruction prefetch mechanism 180. A du_imem_rd signal 220 is asserted when the load/store request unit 170 requests that an instruction be loaded (read). A du_imem_wr signal 230 is asserted when the load/store request unit 170 requests that an instruction be stored (written). The request arbiter 160 actually stalls the instruction prefetch mechanism 180 by asserting an iu_imem_rd_stall signal 240. An iu_imem_rd signal 250 is normally asserted by the instruction prefetch mechanism 180 when prefetching instructions. Deassertion of the iu_imem_rd signal 250 during assertion of the iu_imem_rd_stall signal 240 demonstrates the stalling of the instruction prefetch mechanism 180 by the request arbiter 160. The load/store request unit 170 asserts an iu_imem_ctl_rd signal 260 to instruct the instruction memory controller 123 to a load particular instructions. Signals 270 on the iu_imem_addr address bus contain the address of the instructions that the instruction memory controller 123 is to load or store, and is used both for normal instruction prefetching/fetching by the instruction unit 111 and for loading instructions for modification by the data unit 112. Signals 280 on the imem_iu_data bus (the instruction load bus 133 and the load crosstie bus 150) contain the instructions loaded from the instruction memory 121 for modification. Signals 290 on the du_imem_data bus (the data store bus 142 and the store crosstie bus 190) contain the modified addresses to be stored back in the instruction memory 121.

Turning now to FIG. 3, illustrated is a flow diagram of a method of supporting self-modifying code, generally designated 300, carried out according to the principles of the present invention. The method 300 begins in a start step 310, wherein the load/store request unit 170 of the data unit 112 determines that an unmodified instruction is needed for modification or a modified instruction required storage. The load/store request unit 170 generates a request in a step 320. The request arbiter 160 receives the request.

Upon granting the request (a step 330), the request arbiter 160 couples the load/store request unit 170 to the instruction memory controller 123 and stalls the instruction prefetch mechanism 180 in a step 340. The load/store request unit 170 is now in control of the instruction memory controller 123.

The load/store request unit 170 then employs either the load crosstie bus 150 or the store crosstie bus 190, as appropriate, to assist in loading or storing one or more instructions. This occurs in a step 350. Following a successful loading or storing, the load/store request unit 170 deasserts its request in a step 360. The request arbiter 160 responds by setting tags as appropriate in the pipeline control unit 113 to invalidate lines in the instruction cache 130 (in a step 360), releasing its stalling of the instruction prefetch mechanism 180 and granting access of the instruction prefetch mechanism 180 to the instruction memory controller 123 (both in a step 370). Normal prefetching can then occur to refill the instruction cache 130. The method 300 ends in an end step 380.

Although the present invention has been described in detail, those skilled in the art should understand that they can make various changes, substitutions and alterations herein without departing from the spirit and scope of the invention in its broadest form.

What is claimed is:

1. For use in a processor having separate instruction and data buses, separate instruction and data memories and separate instruction and data units, a mechanism for supporting self-modifying code, comprising:
   a crosstie bus coupling said instruction bus and said data unit;
   a request arbiter, coupled between said instruction and data units, that arbitrates requests therefrom for access to said instruction memory; and
   an instruction prefetch mechanism that prefetches instructions form a said instruction memory into an instruction cache, said request arbiter stalling said prefetch mechanism when said request arbiter grants a request from said data unit for said access to said instruction memory.

2. The mechanism as recited in claim 1 wherein said data unit can employ said instruction memory to contain data.

3. The mechanism as recited in claim 1 wherein said request arbiter gives a higher priority to requests from said data unit.

4. The mechanism as recited in claim 1 wherein at least some instructions prefetched into said instruction cache are invalidated when said request arbiter grants said request.

5. The mechanism as recited in claim 4 wherein a programmable control register is employed to invalidate said at least some instructions.

6. The mechanism as recited in claim 1 wherein said instruction memory is a local instruction memory and said processor further comprises an external memory interface.

7. The mechanism as recited in claim 1 wherein said processor is a digital signal processor.

8. A method of supporting self-modifying code in a processor having separate instruction and data buses, separate instruction and data memories and separate instruction and data units, comprising:
   arbitrating requests from said instruction and data units for access to said instruction memory;
   communicating instructions between said instruction bus and said data unit via a crosstie bus extending therebetween; and
   prefetching instructions from a said instruction memory into an instruction cache; and
   stalling said prefetch mechanism when a request from sad data unit for said access to said instruction memory is granted.

9. The method as recited in claim 8 wherein said data unit can employ said instruction memory to contain data.

10. The method as recited in claim 8 wherein said arbitrating comprises giving a higher priority to requests from said data unit.

11. The method as recited in claim 8 further comprising invalidating at least some instructions prefetched into said instruction cache when said request is granted.

12. The method as recited in claim 11 when a programmable control register is employed to invalidate said at least some instructions.

13. The method as recited in claim 8 wherein said instruction memory is a local instruction memory and said processor further comprises an external memory interface.

14. The method as recited in claim 8 wherein said processor is a digital sigal processor.

15. A digital signal processor, comprising:
   an execution core having an instruction cache;
   a memory unit coupled to said execution core and having separate instruction and data buses, separate instruction and data memories and separate instruction and data units;
   a crosstie bus coupling said instruction bus and said data unit;
   a request arbiter, coupled between said instruction and data units, that arbitrates requests therefrom for access to said instruction memory; and
   an instruction prefetch mechanism that prefetches instructions from a said instruction memory into said instruction cache, said request arbiter stalling said prefetch mechanism when said request arbiter grants a request from said data unit for said access to said instruction memory.

16. The digital signal processor as recited in claim 15 wherein said data unit can employ said instruction memory to contain data.

17. The digital signal processor as recited in claim 15 wherein said request arbiter gives a higher priority to requests from said data unit.

18. The digital signal processor as recited in claim 15 wherein at least some instructions prefetched into said instruction cache are invalidated when said request arbiter grants said request.

19. The digital signal processor as recited in claim 18 wherein a programmable control register is employed to invalidate said at least some instructions.

20. The digital signal processor as recited in claim 15 wherein said instruction memory is a local instruction memory, said data memory is a local data memory and said memory unit further has an external memory interface.

* * * * *